(12) United States Patent
Bailey et al.

(10) Patent No.: US 9,641,538 B1
(45) Date of Patent: *May 2, 2017

(54) AUTHENTICATING AN ENTITY

(75) Inventors: Daniel V Bailey, Pepperell, MA (US); Lawrence N Friedman, Arlington, MA (US); Yedidya Dotan, Tel Aviv (IL); Samuel Curry, North Andover, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,990

(22) Filed: Jun. 28, 2012

Related U.S. Application Data

(63) Continuation-in-part of application No. 13/435,951, filed on Mar. 30, 2012.

(51) Int. Cl.
H04L 29/06 (2006.01)

(52) U.S. Cl.
CPC .................... H04L 63/102 (2013.01)

(58) Field of Classification Search
CPC ...... H04L 63/10; H04L 63/102; H04L 63/107
See application file for complete search history.

(56) References Cited

U.S. PATENT DOCUMENTS

| | | | | |
|---|---|---|---|---|
| 8,776,168 B1* | 7/2014 | Gibson | ................. | H04L 63/104 709/225 |
| 2002/0133365 A1* | 9/2002 | Grey et al. | ........................ | 705/1 |
| 2004/0193870 A1* | 9/2004 | Redlich et al. | ................ | 713/154 |
| 2005/0097320 A1* | 5/2005 | Golan et al. | ................... | 713/166 |
| 2005/0097321 A1* | 5/2005 | Zhu et al. | ...................... | 713/166 |
| 2006/0282660 A1* | 12/2006 | Varghese et al. | ............. | 713/155 |
| 2008/0033637 A1* | 2/2008 | Kuhlman | ................ | H04L 63/10 701/533 |
| 2008/0066165 A1* | 3/2008 | Rosenoer | .......... | G06F 17/30569 726/5 |
| 2008/0183700 A1* | 7/2008 | Gabriel et al. | ..................... | 707/5 |
| 2009/0125427 A1* | 5/2009 | Atwood et al. | .................. | 705/35 |
| 2009/0210924 A1* | 8/2009 | Maurer | ................... | G06F 21/31 726/2 |
| 2009/0327131 A1* | 12/2009 | Beenau | .................. | G06Q 20/32 705/44 |
| 2010/0251388 A1* | 9/2010 | Dorfman | ................ | G06F 21/36 726/29 |
| 2011/0143711 A1* | 6/2011 | Hirson et al. | .................. | 455/410 |
| 2011/0307957 A1* | 12/2011 | Barcelo et al. | ................. | 726/25 |
| 2012/0144468 A1* | 6/2012 | Pratt et al. | ........................ | 726/7 |
| 2013/0227700 A1* | 8/2013 | Dhillon | ................. | G06Q 50/01 726/26 |

* cited by examiner

*Primary Examiner* — David Pearson
(74) *Attorney, Agent, or Firm* — Krishnendu Gupta; Jason A. Reyes

(57) ABSTRACT

There is disclosed a method, system and a computer program product for use in authenticating an entity. An authentication request is received from the entity. Information in connection with the entity is acquired from an external source. Based on the information, a risk score is set such that the riskiness of the authentication request can be readily deduced therefrom.

11 Claims, 3 Drawing Sheets

AUTHENTICATING AN ENTITY

RELATED APPLICATION

This application is a continuation-in-part application claiming priority to co-pending U.S. patent application Ser. No. 13/435,951, filed Mar. 30, 2012, entitled "AUTHENTICATING AN ENTITY IN CONNECTION WITH A COMPUTERIZED RESOURCE", the entirety of which patent application is hereby incorporated by reference herein.

TECHNICAL FIELD

The present invention relates to authenticating an entity.

BACKGROUND OF THE INVENTION

Generally, security systems employ an identity-based authentication scheme in order to verify the identity of an authorized entity before granting access to a computer system or a computerized resource. Security systems can be based on something an authorized entity knows, something an authorized entity is or something that an authorized entity has.

Examples of something an authorized entity knows are a code word, password, personal identification number ("PIN") and the like. Examples of something an authorized entity is include a distinct characteristic or attribute known as a biometric. An example of something an authorized entity possesses is a physical or digital object, referred to generally as a token, that is unique, or relatively unique.

However, it will be appreciated that the threat in connection with security systems is increasing. For example, a password or token may easily be compromised. Indeed, even though it is a little more difficult, it is possible to fraudulently create a copy of a biometric. Therefore, there is a need for further security measures when authenticating an entity.

SUMMARY OF THE INVENTION

There is disclosed a method, system and a computer program product for use in authenticating an entity. An authentication request is received from the entity. Information in connection with the entity is acquired from an external source. Based on the information, a risk score is set such that the riskiness of the authentication request can be readily deduced therefrom.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
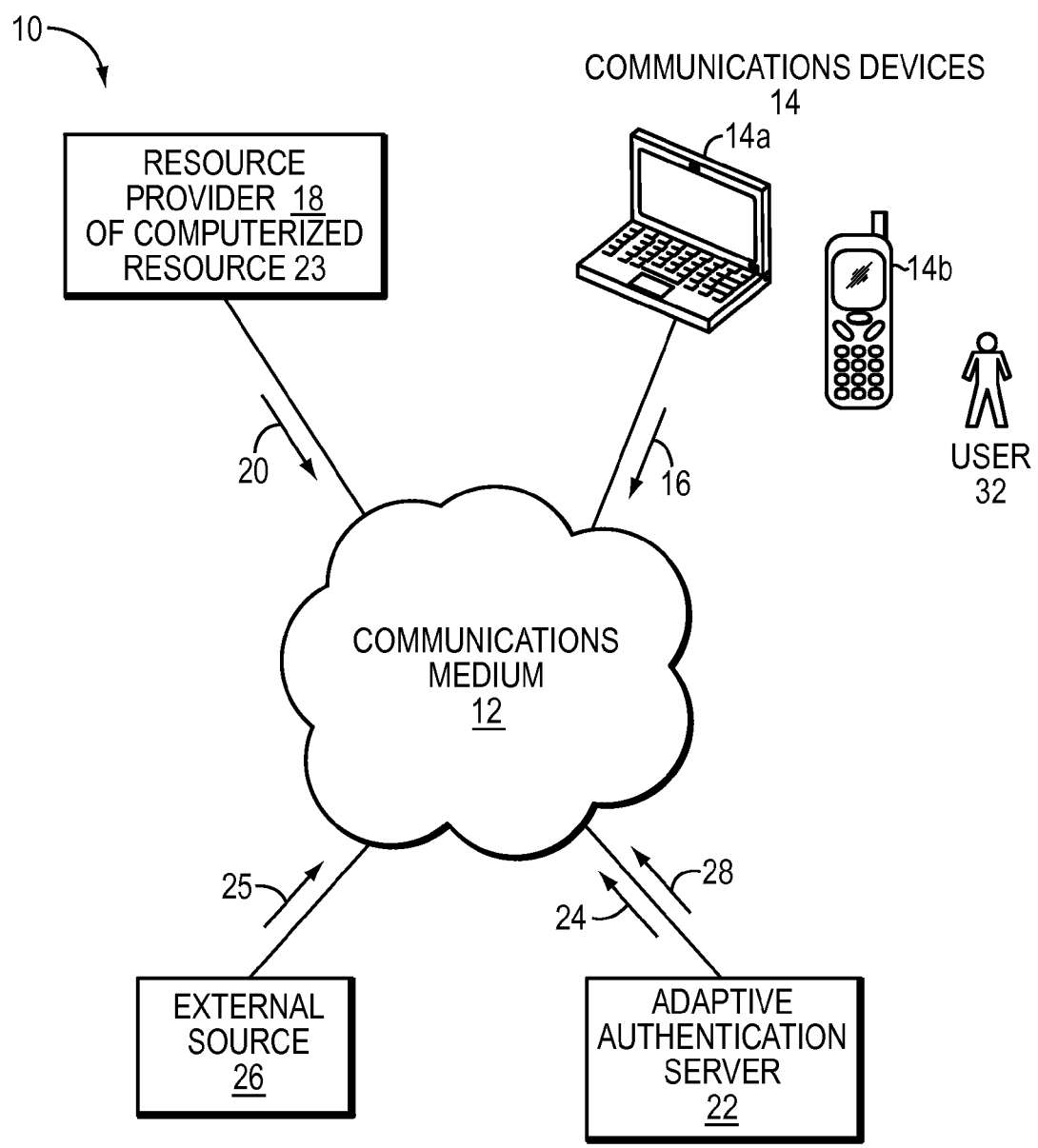
FIG. 1 is a diagram illustrating an example environment for implementing the technique as described herein.

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is disclosed herein a method, system and computer program product for use in authenticating an entity. It will be understood by those skilled in the art that a certain entity may be considered risky. For example, an entity included on the no-fly list maintained by the Transportation Security Administration (hereinafter 'TSA') is essentially banned from flying. It will be appreciated that the no-fly list represents an opinion formed by the TSA about the riskiness of a particular entity. Accordingly, in accordance with the embodiment described herein, the TSA can be considered a trusted external source providing information in connection with the entity which can be used in setting a risk score in connection with the entity such that the riskiness of the entity can be readily deduced therefrom.

It will also be appreciated that the technique as may be further extended. For example, if a trusted external source such as passport control has recently authenticated an entity at a particular location then a subsequent authentication request shortly thereafter while the entity is near that location can be considered more favorably given the earlier authentication and the likelihood of the entity being close to that location. The technique is not limited to government agencies. For example, the recent authentication by a machine such as an ATM may influence other subsequent authentication decisions made while the entity is nearby.

Referring to FIG. 1, there is illustrated an example environment 10 for implementing the technique of authenticating an entity as described herein. The environment 10 comprises communications devices 14, a communications medium 12, a resource provider 18, an adaptive authentication server 22 and an external information source 26.

The communications devices 14 may comprise smartphones, personal digital assistants, laptop computers, desktop computers, tablet computers, cameras, MP3 players, portable game systems, and the like. However, it will be understood that the communications devices 14 are not limited to such devices as listed above but include all devices with communications capabilities. The communications devices 14 may be constructed and arranged to submit an authentication request 16 to the resource provider 18 via the communications medium 12 which then delegates the authentication task to the adaptive authentication server 22. However, it will be appreciated that in some embodiments the authentication request 16 may be sent direct to the adaptive authentication server 22 over the communications medium 12 rather than indirectly through the resource provider 18. It will also be appreciated that the authentication request may comprise an identifier in order to facilitate identification.

It will be understood that an entity such as a user 32 may comprise a plurality of communications devices such as a laptop computer 14a and a smartphone 14b. It will be appreciated that in this embodiment the laptop computer 14a may facilitate access to the resource provider 18 via the communications medium 12 and the smartphone 14b may perform its usual functionality. However, it will also be appreciated that the above example is for illustration purposes only as it will be evident that the smartphone 14b may also be configured to facilitate access to the resource provider 18 as well as perform its usual other functionality.

The communications medium 12 provides network connections between the communications devices 14, the resource provider 18, the adaptive authentication server 22 and the external source 26. The communications medium 12 can implement a variety of protocols such as TCP/IP, UDP, ATM, Ethernet, Fibre Channel, combinations thereof, and the like. Furthermore, the communications medium 12 can include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

The resource provider 18 can provide the user 32 of the communications devices 14 with access to one or more computerized resources 23 following successful user authentication. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

The adaptive authentication server 22 as will be described in further detail below is configured to receive an authentication request 20 from the resource provider 18 over the communications medium 12. It will be appreciated from the foregoing that the adaptive authentication server 22 may also in some embodiments receive authentication requests direct from the communications devices 14. In either embodiment, the authentication requests may be sent to the adaptive authentication server 22 in order to facilitate authentication by performing risk-based authentication.

It will be understood that in this embodiment the adaptive authentication server 22 is configured to perform risk-based assessment by submitting a request 24 to the external source 26 for information in connection with the user 32 in response to receiving the authentication request 20. Furthermore, it will be understood that the adaptive authentication server 22 is configured to perform risk-based assessment by performing an analysis of the information in connection with the user 32. Additionally, it will be understood that the adaptive authentication server 22 is constructed and arranged to send an adaptive authentication result 28 to the resource provider 18 via the communications medium 12 on completion of the risk based authentication in the server 22 in order to grant or deny authentication to the computerized resource 23.

The external source 26 can be a trusted third-party external source with the ability to provide information in connection with the user 32. It will be understood that in this embodiment the information will be submitted 25 from the external source 26 in response to receiving the request 24 from the server 22. It will also be appreciated that in one embodiment the information provided by the external source may be security details in connection with the user 32. For example, the information provided may be the no-fly list as maintained by the TSA. It will be appreciated by those skilled in the art that the no-fly list includes persons with flight restrictions placed thereon. It will be understood that these persons may be considered to represent a high security risk and the adaptive authentication server 22 may as a result set the risk score accordingly based on information acquired. In a further embodiment the information provided by the external source may be the financial records in connection with the user. For example, the information may be the credit rating of a user 32 as maintained by a financial institution. It will be appreciated that persons with a poor credit rating may be considered a high risk for financial fraud and the adaptive authentication server 22 may as a result set the risk score accordingly based on information acquired. In a still further embodiment, the information provided by the external source may be a criminal record in connection with the user 32. For example, the information may be a criminal record of a user 32 as maintained by a crime prevention organization which may assist in determining the riskiness of the user 32. It will be understood from the foregoing that the information provided will be that as considered suitable for determining the riskiness of the user. Furthermore, it will be understood that multiple sources of information may be acquired in order to determine the riskiness of the user.

Figure 2:
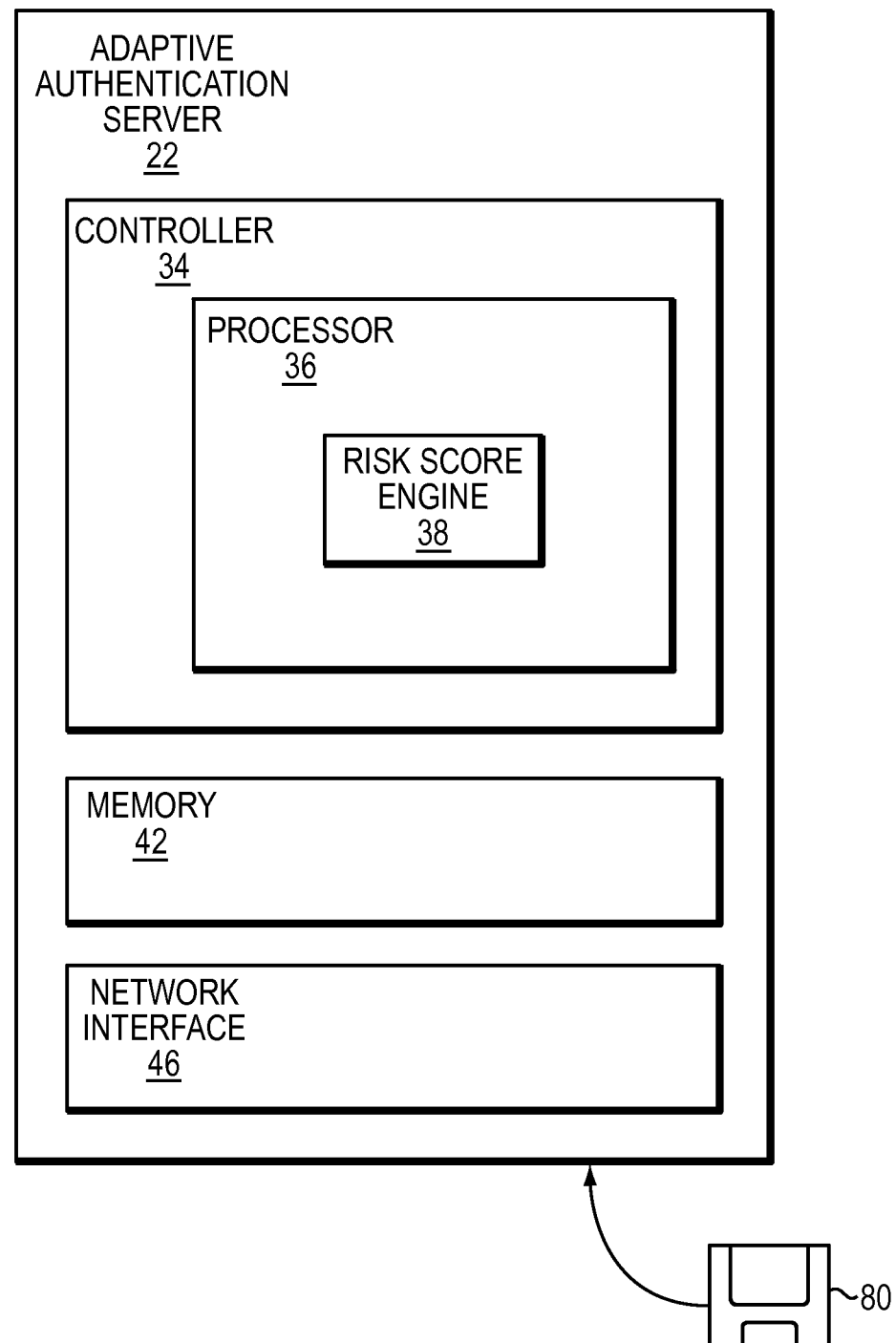
FIG. 2 is a diagram illustrating an example adaptive authentication server within the environment illustrated in FIG. 1.

Referring to FIG. 2, there is illustrated the components of the adaptive authentication server 22. The adaptive authentication server 22 comprising a network interface 46, a memory 42 and a controller 34.

The network interface 46 is constructed and arranged to send and receive data over the communications medium 12. Specifically, in this embodiment, the network interface 46 is configured to receive the authentication request 20 from the resource provider 18 over the communications medium 12 as well as receiving information 25 in connection with the user 32 from the external source 26 over the communications medium 12. Additionally, in this embodiment, the network interface 46 is configured to send the request 24 to the external source 26 over the communications medium 12 as well as the authentication result 28 to the resource provider 18 over the communications medium 12.

The memory 42 may be configured to store the information in connection with the user as acquired from the external source 26. It will be appreciated that the memory may also in some embodiments include a database which may store location history data in connection with one of the communications device associated with the user. It will be appreciated that such location data may be considered to emulate the movements of the user over a period of time. It will also be appreciated that such location history data may be compared with current location data in order to assist in the determination of the risk score. The database may include event data which can include discrete locations of events as well as the time of events. For example, the event data may be a sporting event, a protest event, a cultural event, a musical event, a social event and/or a celebratory event. It will be understood that such event data may be indicative of a greater risk in a particular location at a particular time. Such data may also assist in the determination of the risk score. The database may also include user data with respect to the user which may be considered relevant when setting a risk score in connection with the user. In this embodiment the memory 42 generally takes the form of, e.g., random access memory, flash memory or a non-volatile memory.

The controller 34 includes a processor 36 which takes the form of, but is not limited to, Intel or AMD-based MPUs, and can include a single or multi-cores each running single or multiple threads. The processor 36 is coupled to memory 42 and includes a risk score engine 38 constructed and arranged to assign a risk score to an authentication request based at least on the analysis of the information in connection with the user 32 as received from the external source 26.

At this point, it should be understood that the controller 34 of the authentication server 22 is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product is capable of delivering all or portions of the software. The computer program product 80 has a non-transitory (or non-volatile) computer readable medium which stores a set of instructions which controls one or more controller operations. Examples of suitable computer readable storage media include tangible articles of manufacture and apparatus which store instructions in a non-volatile manner such as CD-ROM, flash memory, disk memory, tape memory, and the like.

Figure 3:
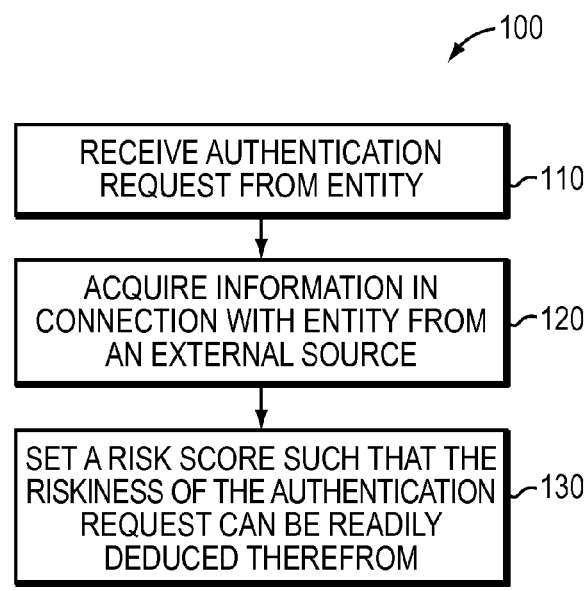
FIG. 3 is a flowchart summarizing the steps of a technique for use in authenticating an entity.

Referring to FIG. 3, there is illustrated a technique 100 for use in authenticating an entity in an environment 10 substantially similar to that as described above. The technique comprises receiving 110 an authentication request 16 from the entity. For example, the entity can be the user 32 as discussed above. It will be understood that in this embodiment the authentication request 16 is received for access to the computerized resource 23. For example, the authentication request 16 may be sent using the laptop computer 14*a* to the resource provider 18 of computerized resource 23. The authentication request 16 is sent to the resource provider 18 over the communications medium 12 before the resource provider 18 sends an authentication request 20 to the authentication server 22. It will be understood that the authentication request 20 may be received in the authentication server 22 by the network interface 46.

The technique comprises acquiring 120 information in connection with the user 32 from an external source 26. It will be understood that in this embodiment the adaptive authentication server 22 may acquire the information from a trusted source 26 by requesting 24 the information from the source 26. It will be appreciated that the information is not limited to but may include security related, financial related or criminal related information in connection with the user. For example, the external source or sources may provide a no-fly list, a credit rating list and/or a criminal activity list. Indeed, the external source or sources 26 may provide multiple discrete pieces of information to be aggregated together to form a picture of the user. It will be understood that the information submitted 25 by the external source or sources 26 may be received in the authentication server 22 by the network interface 46.

It will be appreciated from the foregoing that in one embodiment the information may be acquired by requesting 24 the information from the source 26. However, it will be appreciated that in other embodiments, the information may be acquired periodically from the external source 26 and stored in memory 42 without requesting the information.

The technique comprises setting 130 a risk score based on the acquired information such that the riskiness of the authentication request can be readily deduced therefrom. It will be understood that in this embodiment the risk score can be set within a range of riskiness with one end of the range indicating extreme riskiness and the other end indicating minimum riskiness.

The step of setting the risk score may comprise performing an analysis of the acquired information in connection with the entity. It will be appreciated from the foregoing that the processor 36 may perform the analysis of the information acquired from the external source 26. It will be understood that if the processor identifies certain trends in the information the risk score will be affected accordingly. For example, if the user has a poor credit rating and has a criminal record the risk score will indicate a high risk. It will be appreciated that in one embodiment the risk score can be dynamically updated in response to the information acquired from the trusted external source 26 changing periodically.

It will also be appreciated that the technique may further comprise generating an authentication result by outputting, as an authentication signal, the risk score. It will be appreciated that the risk score may form part of adaptive authentication result 28 sent to the resource provider 18 via the communications medium 12. In one embodiment, the risk score enables granting of access to the computerized resource 23 in response to the risk score exceeding a predefined threshold and denying access to the computerized resource 23 in response to the risk score not exceeding the predefined threshold.

While the above description describes the risk score as being set based on the information in connection with the entity, it will be appreciated that in some embodiments the risk score may be set in response to additional other factors. For example, an input signal comprising the current location of one of the communications devices associated with the entity may be sent from one of the communications devices to the server which may in turn receive and derive the current location from the input signal. It will be appreciated that the current location may be considered to emulate the movement of the user such that the current location in connection with the communications device can be used together with the information from the source 26 to set the risk score. It will be appreciated that the information from the trusted external source may also indicate the location of the user. For example, the information from passport control in a particular airport may indicate a certain location. If the location of the airport and the current location are similar it will be appreciated that the risk score would be set to indicate a low risk.

It will be appreciated that in a further embodiment the technique may perform an analysis between a current location of a communications device and a location history in connection with the communications device which may be stored in a database in memory. It will be understood that the risk engine 38 may generate a risk score based on the analysis of the current location and location history as well as the analysis of the information in connection with the user. For example, the analysis of the current location history and the current location may determine the likelihood of the user being in a particular location based on history. This analysis could be combined with the information from the source 26 for setting the risk score.

Furthermore, the adaptive authentication server may be configured for recognizing that certain locations are of a greater threat. For example, it will be appreciated that certain countries, or areas within a metropolitan area, tend to be of greater threat than others. In addition, it will be appreciated that certain countries or areas within a metropolitan area may be transiently subject to additional risk factors. For example, a temporary influx of people may be expected in an area due to a large sporting event, concert or the like. Such event data may be stored in a database in memory. It will be appreciated that such event data may be used with the information from the source for setting the risk score.

Moreover, it will be appreciated that the adaptive authentication server may be configured to include a user profile which may be combined with the information from the source 26. It will be appreciated that such user data may also be used with the information from the source for setting the risk score.

While the above description described the risk score being set based on the information in connection with the entity, it will be appreciated that in some embodiments the risk score may be set in response to additional other factors such as location and/or user behavior. For example, the current user behavior may be analyzed to assist in setting the risk score. It will be appreciated that if the user is attempting to access sensitive subject-matter the risk engine 38 may combine such user behavior with the information from the source when setting the risk score.

While the above technique describes acquiring information from an external source, it will be appreciated that the external source may only be configured to provide certain information based on regulations or legislation. It will be appreciated that the technique will be configured such the risk score is not adversely affected by different regulations and/or legislation.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for use in authenticating an entity, the method comprising the steps of:
   receiving a request to authenticate the entity;
   in response to receiving the request, determining a current location of the entity;
   acquiring information from a trusted third-party external source for use in authenticating the entity, wherein the information comprises at least one of security-related, financial-related or criminal-related information in connection with the entity, further wherein the information comprises an opinion formed by the trusted third-party external source relating to the riskiness of the entity;
   performing an analysis of the current location and the information from the trusted third-party external source in order to assess risk in connection with the request;
   in response to performing the analysis, determining a challenge to issue to the entity, wherein the challenge relates to the information from the trusted third-party external source; and
   based on the challenge, generating an authentication result for use in authenticating the entity;
   characterized in that at least one of the steps of the computer-implemented method is performed by a computing device comprising at least one processor.

2. The method as claimed in claim 1, wherein the risk score can be generated within a range of riskiness with one end of the range indicating extreme riskiness and the other end indicating minimum riskiness.

3. The method as claimed in claim 1, wherein the risk score can be dynamically updated in response to the information acquired from the external source changing periodically.

4. The method as claimed in claim 1, further comprising:
   granting access to the entity to a resource in response to the risk score exceeding a predefined threshold; and
   denying access to the entity to the resource in response to the risk score not exceeding a predefined threshold.

5. An apparatus for use in authenticating an entity, the apparatus comprising:
   at least one processing device, said at least one processing device comprising a processor coupled to a memory;
   wherein the apparatus is configured to:
   receive a request to authenticate the entity;
   in response to receiving the request, determine a current location of the entity;
   acquire information from a trusted third-party external source for use in authenticating the entity, wherein the information comprises at least one of security-related, financial-related or criminal-related information in connection with the entity, further wherein the information comprises an opinion formed by the trusted third-party external source relating to the riskiness of the entity;
   perform an analysis of the current location and the information from the trusted third-party external source in order to assess risk in connection with the request;
   in response to performing the analysis, determine a challenge to issue to the entity, wherein the challenge relates to the information from the trusted third-party external source; and
   based on the challenge, generate an authentication result for use in authenticating the entity.

6. The apparatus as claimed in claim 5, the risk score can be generated within a range of riskiness with one end of the range indicating extreme riskiness and the other end indicating minimum riskiness.

7. The apparatus as claimed in claim 5, wherein the risk score can be dynamically updated in response to the information acquired from the external source changing periodically.

8. The apparatus as claimed in claim 5, wherein the apparatus is further configured to:
   grant access to the entity to a resource in response to the risk score exceeding a predefined threshold; and
   deny access to the entity to the resource in response to the risk score not exceeding a predefined threshold.

9. A computer program product for use in authenticating an entity, the computer program product being embodied in a non-transitory computer readable storage medium and comprising instructions for:
   receiving a request to authenticate the entity;
   in response to receiving the request, determining a current location of the entity;

acquiring information from a trusted third-party external source for use in authenticating the entity, wherein the information comprises at least one of security-related, financial-related or criminal-related information in connection with the entity, further wherein the information comprises an opinion formed by the trusted third-party external source relating to the riskiness of the entity;

performing an analysis of the current location and the information from the trusted third-party external source in order to assess risk in connection with the request;

in response to performing the analysis, determining a challenge to issue to the entity, wherein the challenge relates to the information from the trusted third-party external source; and based on the challenge, generating an authentication result for use in authenticating the entity.

10. The computer program product as claimed in claim 9, wherein the risk score can be generated within a range of riskiness with one end of the range indicating extreme riskiness and the other end indicating minimum riskiness.

11. The computer program product as claimed in claim 9, wherein the risk score can be dynamically updated in response to the information acquired from the external source changing periodically.

* * * * *